UNITED STATES PATENT OFFICE.

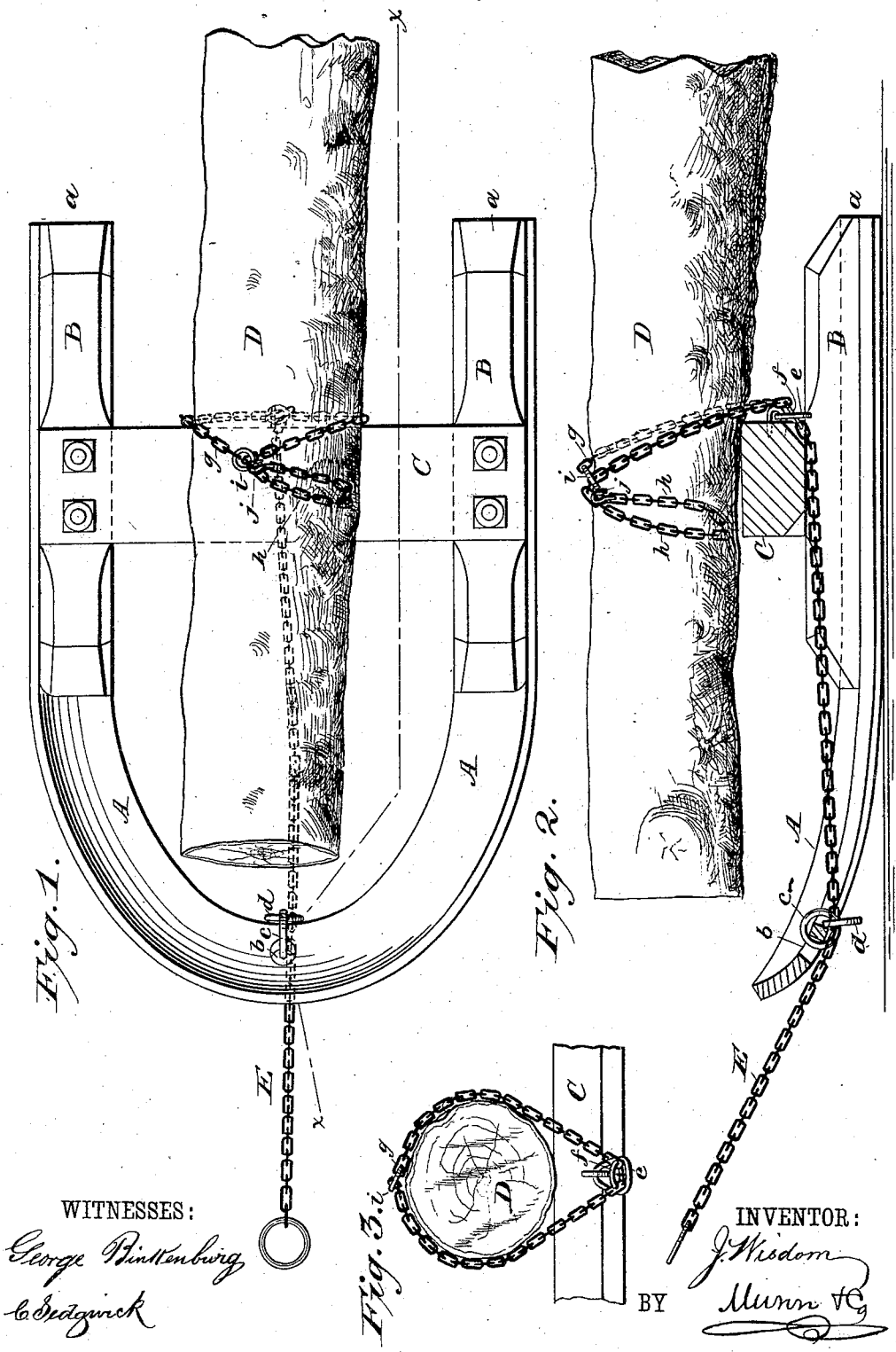

JOHN WISDOM, OF MOOSE LAKE, MINNESOTA.

LOGGING-SLED.

SPECIFICATION forming part of Letters Patent No. 367,172, dated July 26, 1887.

Application filed March 11, 1887. Serial No. 230,537. (No model.)

*To all whom it may concern:*

Be it known that I, JOHN WISDOM, of Moose Lake, in the county of Carlton and State of Minnesota, have invented a new and Improved Logging-Tool, of which the following is a specification, reference being had to the annexed drawings, forming a part thereof, in which—

Figure 1 is a plan view of my improved tool. Fig. 2 is a longitudinal section taken on line $x$ $x$ in Fig. 1, and Fig. 3 is a partial rear elevation.

Similar letters of reference indicate corresponding parts in all the views.

The object of my invention is to provide a tool for supporting and guiding the ends of logs while they are being moved from one place to another.

My invention consists in a runner or shoe formed of a bar of metal having a concavo-convex transverse section and bent into U form, the middle of the U-shaped bar being curved upward to facilitate its passage over the snow or ground, and in the combination, with the shoe thus formed, of a cross-bar or bolster for supporting the log and an arrangement of chains for lashing the log to the bolster and for receiving the evener to which the horses are hitched.

The bar A, forming the main part of the shoe, is concavo-convex in cross-section and bent into U shape, the middle portion being curved upward above the parallel arms of the U-shaped bar, forming a runner which readily passes over the snow or ground, and is provided with a sufficient bearing-surface to prevent it from cutting too deeply into the surface upon which it runs. To the upper surface of the parallel ends $a$ $a$ are secured the bars B, upon which rests a cross-bar or bolster, C, for supporting the log D.

In the forward portion of the runner is formed a hole, $b$, in which is inserted a ring, $c$, connected with another ring, $d$, hanging below the runner. A chain, E, passes through the ring $d$, under the bolster C, through a ring, $e$, where it is connected with a ring, $f$, which receives the ends of two chains, $g$ $h$. The chain $g$ is provided with a ring, $i$, through which the chain $h$ extends, and the chain $h$ is provided at its extremity with a hook, $j$, for engaging the chain close to and above the ring $i$. The horses are hitched to the free extremity of the chain E, and in drawing upon the said chain cause the chains $g$ $h$ to be drawn tightly upon the log D, holding it upon the bolster. The rear end of the log rests upon and is drawn along on the surface of the snow or earth.

Having thus fully described my invention, I claim as new and desire to secure by Letters Patent—

1. A logging-tool formed of the bar A, having a concavo-convex cross-section and curved upward at its mid-length, the bars B, secured to the parallel arms of the bar A, and the bolster C, substantially as shown and described.

2. In a logging-tool, the combination of the shoe formed of the bar A, having a concavo-convex cross-section, and provided with the aperture $b$, the bars B, secured to the parallel arms of the bar A, the bolster C, the chains E $g$ $h$, and the rings $c$ $d$ $e$, substantially as shown and described.

JOHN WISDOM.

Witnesses:
J. R. MYERS,
B. F. MYERS.